ic arc renders a portion of the base metal molten,

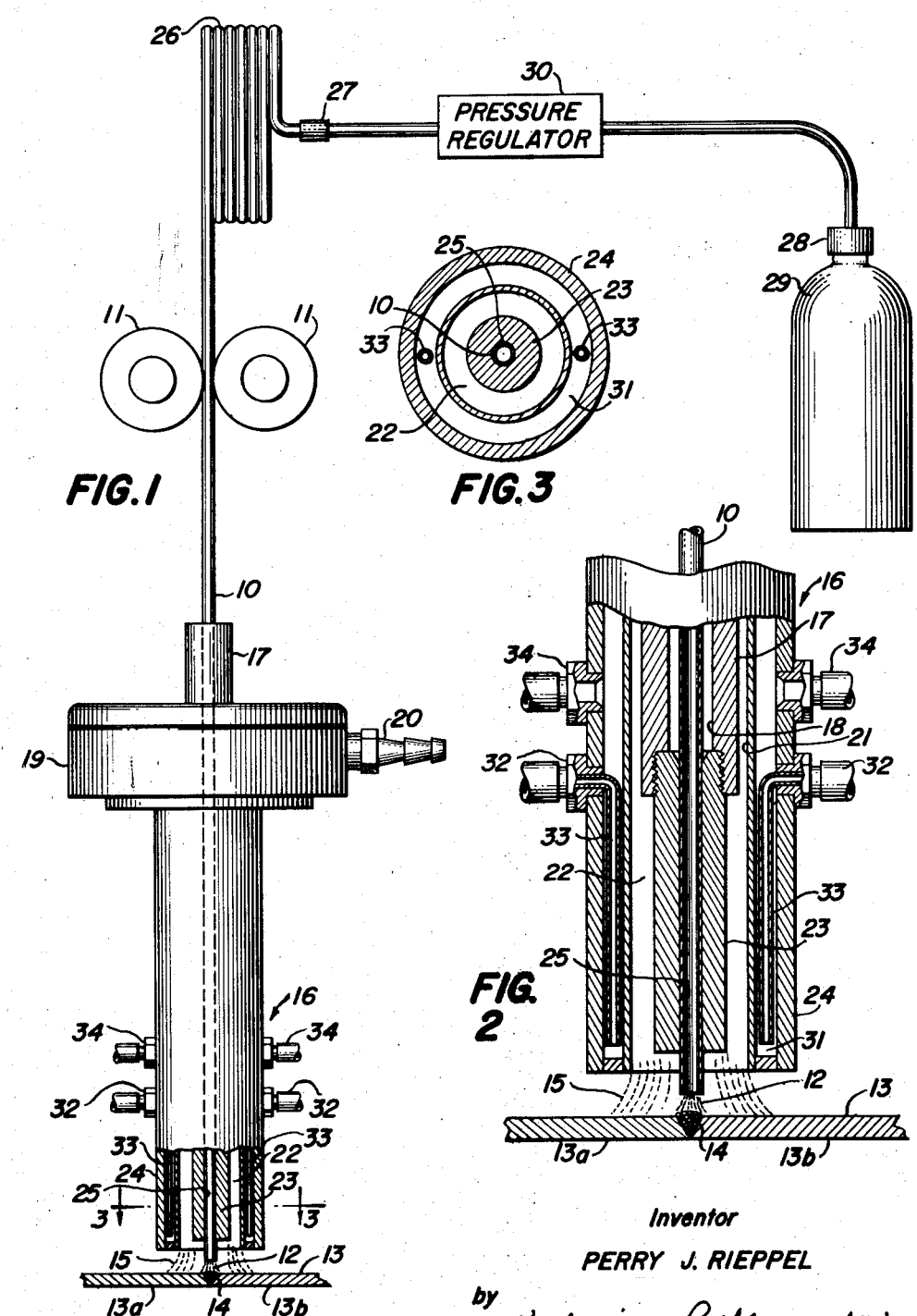

United States Patent Office 2,963,570
Patented Dec. 6, 1960

2,963,570

ARC WELDING METHOD AND APPARATUS

Perry J. Rieppel, Worthington, Ohio, assignor, by mesne assignments, to Chemetron Corporation, a corporation of Delaware Filed Jan. 16, 1956, Ser. No. 559,160

9 Claims. (Cl. 219—74)

This invention relates to a method of arc welding and to apparatus particularly useful in such method. In a broader sense, it relates to a method and apparatus for transferring metal and, more generally, to a new and improved method and apparatus for utilizing an electric arc as a means for transferring metal from a hollow welding electrode or rod to a base metal.

In electric arc welding, metal may be transferred from a consumable electrode to a base metal by a flow of metallic globules driven by electromagnetic forces, by expansion of gases or vapors, or by some other force that is less readily explained. The heat generated by the electric arc renders a portion of the base metal molten, and this molten metal is combined with the metallic globules transferred from the consumable electrode to provide a mass of molten metal, which, when cooled, intregally unites either a plurality of pieces of base metal or a surfacing layer and the base metal. In order to provide weld metal of the most desirable strength and ductility, it is necessary to control the degree of porosity and general quality of the metal by controlling the occlusion of such gases as oxygen, nitrogen and hydrogen from the atmosphere to the molten or fluid metal forming the weld metal.

If ordinary atmosphere or air reaches the arc, or if excessive oxygen, nitrogen or hydrogen resulting from local reactions is present in the arc, there would result a serious degree of oxidation or the formation of metal nitrides, or both, in the weld metal, usually accompanied by extensive porosity or "gassing" of the deposited weld metal. For this reason, the technique of shielding the arc with an inert or a beneficial active gas has been developed. Carbon dioxide is the cheapest and most readily available gas for this purpose but it has several definite disadvantages. Its major deficiency is with respect to metal transfer from the consumable electrode to the weld pool. In carbon dioxide the transfer is erratic and inefficient. Relatively large globules of molten metal collect on the end of the electrode and resist removal until their large size causes them to drop off. The large globules on impinging against the weld pool or the base metal create a good deal of metal spattering; in some cases as much as 20 to 25% of the metal is lost in this way. Another disadvantage of carbon dioxide is that it dissociates at the high temperature of the arc into carbon monoxide and oxygen, and the latter causes oxidation of the weld metal. Argon is free from the deficiencies of carbon dioxide but its cost is substantially greater and its use in the welding of mild steel is too expensive for general application.

The physical strength of the welded joint between two pieces of base metal or between the base metal and the transferred metal is dependent to a large extent upon certain physical characteristics of the fluid metal, the surrounding gaseous medium, the rate of cooling, and the introduction of certain chemical elements. All of these characteristics must be capable of control in a satisfactory welding method, and it is desirable that such method be adapted to operate at high speed with maximum visibility of the work or workpiece. Preferably, such method should also be adapted to use any of the standard sources of electric energy, such as an alternating current source or a direct current source with either straight or reverse polarity. The prior art methods of achieving control over these characteristics, and particularly the methods of eliminating the effects of the atmosphere on the arc and on the resulting weld, have comprised the use of various shielding means and methods, most of which have limitations for welding operations in many applications.

To satisfactorily weld mild steel, it is ordinarily essential, in order to provide a sound weld of high strength and ductility without porosity, to employ certain chemical elements for controlling metal transfer, for deoxidizing the weld pool, and for controlling the weld chemistry. For instance, porosity can be controlled effectively by the addition of certain deoxidizers during the weld operation such as manganese, aluminum, silicon, titanium, and similar materials.

Carbon dioxide has been suggested as a shielding gas for welding mild steel, but it has not proved to be completely satisfactory without the use of composite electrodes because the metal transfer is erratic. The use of inert or monatomic gases such as argon and helium, or mixtures of such gases, for shielding the arc is relatively expensive since argon costs about ten to twenty times as much as carbon dioxide and helium is not always commercially available. It would be desirable, therefore, to provide an improved welding process with good metal transfer and other general arc characteristics which employs the inexpensive carbon dioxide shielding and which is less expensive than a monatomic gas shield.

While carbon dioxide shielding is a significant improvement in arc welding for welding mild steel particularly if a composite electrode is employed therewith, there are certain disadvantages to the method. As noted above, metal transfer is often globular and erratic and there is a great amount of spatter. These characteristics of metal arcs in carbon dioxide can be suppressed by the use of a short digging arc, but then the resulting weld bead commonly has an undesirable profile that is particularly poor for multipass welds. Weld profile, metal transfer, general operation of the process, and mechanical properties of deposited welds can be improved by the present invention.

Accordingly, it is an object of the present invention to provide a new and improved method and apparatus for transferring metal from a consumable electrode to a base metal.

It is another object of the present invention to provide an improved method of electric arc welding in which a sound non-porous weld can be produced.

A further object of the present invention resides in the provision of a novel method of transferring metal from a consumable electrode in which the characteristics of the weld produced are capable of being controlled within predetermined limits.

A still further object of the present invention is to provide a new and improved method of electric arc welding which is capable of producing non-porous welds of good characteristics by the use of relatively cheap materials.

It is another object of the present invention to provide a novel method of electric arc welding in which a shielding gas is applied to the area encircling the electric arc and a monatomic gas is circulated through a hollow electrode to control metal transfer and reduce spatter.

It is still another object of the present invention to provide an improved process of electric arc welding and apparatus therefor which is capable of welding at high speed with unrestricted visibility of the work.

It is another object of the present invention to provide an improved hollow welding electrode.

Further objects and advantages of the present invention will become apparent as the following description proceeds, and the features of novelty which characterize the invention will be pointed out with particularity in the claims annexed to and forming a part of this specification.

These and other objects are accomplished by the method and apparatus of the present invention. The method comprises generally surrounding a hollow electrode with a gaseous shield of carbon dioxide and passing through the center of the hollow electrode a stream of monatomic gas such as argon or helium at a low rate. The shield of carbon dioxide surrounds the electric arc and the stream of monatomic gas improves metal transfer across the arc. In particular, the monatomic gas has a profound effect on metal transfer whereby small globules of molten metal gather on the electrode tip and are induced to depart at a regular rate in small particles or spray and move directly to the weld pool without spatter.

The apparatus comprises a hollow electrode formed of mild steel, particularly steel having low carbon, low phosphorus and low sulfur content with medium manganese and medium silicon content. When such an electrode is used in an arc welding process with the surrounding shield of carbon dioxide and the internal slow stream of inert gas such as argon or helium, it is not necessary that fluxes or shielding materials be used to protect the molten weld metal. It is thus possible to conduct successful arc welding without the use of more complicated electrodes.

For a better understanding of the present invention, reference may be had to the accompanying drawing in which:

Fig. 1 is a somewhat schematic view partly in section of an arc welding head shown associated with a workpiece and connected to a supply of monatomic gas and a supply of carbon dioxide;

Fig. 2 is an enlarged sectional view of a portion of the welding head and workpiece illustrated in more detail in the present invention; and Fig. 3 is an enlarged transverse sectional view of the welding head taken along line 3—3 of Fig. 1 assuming Fig. 1 shows the complete structure.

Referring now to the drawing, there is illustrated in Fig. 1 a hollow electrode 10 (which is also illustrated in Figs. 2 and 3) which is a bare metal electrode, but which also is in effect a hollow tube. The electrode 10 may have different external diameters and may have different internal and external shapes or configurations, although the cylindrical tube is, of course, preferred. Electrode 10 is fed by feed rollers 11 at such a rate that there is maintained an arc 12 between the lower end of the electrode 10 and the base metal 13. In Figs. 1 and 2, by way of illustration, the base metal 13 comprises two sections 13a and 13b which are to be welded together. The heat of the arc is sufficient to weld the base metal or workpiece 13 so that a pool of molten metal 14 is maintained, as best indicated in Fig. 2 of the drawing. Surrounding the arc is an envelope 15 of shielding carbon dioxide gas which serves to exclude the atmosphere from the arc 12 and also from the surrounding arc-generated gas or metal vapor. Through the hollow electrode 10 passes a slow stream of a monatomic gas such as argon or helium. This stream of gas passes through the arc 12 and mixes with the shielding envelope of carbon dioxide 15. The flow of carbon dioxide is preferably adjusted with reference to atmospheric pressure so that atmospheric air is excluded from the region of the arc. At the same time the pressure of the shielding envelope of carbon dioxide 15 is maintained sufficiently low so that it does not interfere with the arc 12 or dilute or disturb the arc stream. Likewise, the stream of argon or helium is maintained at such a rate that it does not disturb the arc stream 12 or create excessive turbulence in the region of the arc.

For the purpose of continuously supplying the electrode 10 to the arc 12, feed rollers 11 are provided which feed the electrode 10 to an electrode holder or nozzle generally indicated at 16. As shown in Fig. 2, the electrode holder 16 includes a cylindrical body member 17 having a central longitudinal passageway 18, the diameter of which is somewhat greater than the electrode 10, so that the latter can readily be fed therethrough. As indicated in Fig. 1, the body member 17 is mounted in a supporting member 19 which is a part of an automatic arc welding head, the details of the construction of which are well known and are not shown herein.

To provide for supply of carbon dioxide shielding gas the supporting member 19 has a connector fitting 20 which is mounted and arranged to be connected to a suitable source of carbon dioxide. Connector fitting 20 communicates by way of an annular chamber in the supporting member 19 with a longitudinal passageway 21 that extends around the body member 17 parallel to the central longitudinal passageway 18. At its lower end the passageway 21 opens into an annular or ring-like opening 22 which is defined by a portion of the inner surface of an outer barrel 24 and a guide tube 23 which is threaded onto the lower end of the body member 17. The annular opening 22 is provided to distribute uniformly the shielding gas supplied by the passageway 21 and cause the shielding gas to flow in a laminar fashion to define the envelope 15 of the shielding gas, as described above, surrounding the arc 12.

The guide tube 23 is preferably made of copper and is so constructed as to provide a close-fitting cylindrical longitudinal opening 25 through which the electrode 10 passes. The diameter of the opening 25 defined within the guide tube 23 is so related to the diameter of the electrode 10 as to provide smooth contact therebetween. Besides guiding the electrode into position near the base metal 13, the guide tube 23 serves as electrical contact with the electrode for the transmission of welding current thereto.

Electrode 10 above feed rollers 11 is conveniently stored in a coil as illustrated at 26. The end of the electrode 10 remote from the arc is attached by a suitable swivel connection, such as a "quick" connector, illustrated diagrammatically by 27, to connector fitting 28 to a supply of monatomic gas such as argon or helium illustrated by tank 29. A pressure regulating mechanism, diagrammatically illustrated by 30, may be connected to the argon or helium supply line to adjust the gas pressure within the electrode so that the flow of gas in the vicinity of the arc is maintained at a uniform rate. Since the electrode is, in fact, a long pipe of small diameter, there is a substantial pressure drop throughout the length of the pipe and the pressure of gas entering the electrode 10 must regularly be decreased to compensate for the amount of electrode consumed in any given period of time.

Any suitable source of energy such as commonly employed in electric arc welding may be utilized, such as a direct current generator. When the positive terminal of the generator is connected to the electrode holder or nozzle 16 while the negative terminal is connected to the base metal or workpiece 13, the arrangement is known in the art as a reverse polarity connection and has been found very satisfactory for maintaining the welding arc 12. It is also possible to employ as the source of welding current a direct current generator connected with what is termed straight polarity or to employ an alternating current source with or without superimposed high frequency energy for further stabilizing the arc.

It will be understood that the welding electrode 10 is fed toward the base metal or workpiece 13 at a rate such as to maintain the arc 12 and to supply the required amount of molten metal 14 within the intermediate arc zone. The flow of carbon dioxide through the annular passageway 22 is adjusted so that it does not create turbulence or disturb the normal operation of the arc 12, and yet forms a shield or envelope which surrounds the arc and excludes contact of the latter with the atmosphere. At the same time, a supply of helium or argon is provided through the hollow electrode 10 to form another gas shield. Greatly improved weld characteristics have been obtained in this manner and it is believed that they may be due to shielding, improved metal transfer, and/or some change in weld chemistry, or a combination of all or several of the foregoing factors by virtue of the shielding arrangement described above.

To prevent adherence of molten metallic particles to the skirt of the outer barrel 24 and the guide tube 23 and the resultant partial closure of the lower end of the annular passageway 22, as well as to insure avoidance of arcing, provision is made for circulating a coolant such as water through the electrode holder or nozzle 16. For this purpose an annular chamber 31 is provided in the outer barrel 24. The annular chamber 31 surrounds the passageways 21 and 22 and is defined by inner and outer walls of the outer barrel 24. Connector fittings 32 are provided, as shown in Fig. 2 of the drawings, for supplying cooling liquid to the annular chamber 31. These fittings 32 are connected to tubes or pipes 33 which are located within the annular chamber 31 and descend therein close to the bottom thereof. Cooling liquid enters through the connector fittings 32, passes down through the tubes 33 and out into the annular chamber 31 where it absorbs heat and then passes upward to connector fittings 34 and out of the welding head.

It is preferable that the barrel 24 and the guide tube 23 be formed of metal having good thermal conductivity as well as good electrical conductivity. Preferably, they are formed of copper and sufficient water is supplied and circulated through the annular chamber 31 to extract heat from the electrode holder or nozzle 16 to maintain the temperature of the barrel 24 and the guide tube 23 low enough to minimize fouling by metal particles, as well as to preclude arcing or short-circuiting and the consequent dissipation of energy.

In the practice of this invention it has been found that the rate of flow of the shielding gases must be controlled within certain limits for successful arc welding. The rate of flow of argon or helium through the hollow electrode should be so controlled that turbulence is kept to a minimum. In an electrode having an internal diameter of 7/64 inch, it has been found that the flow rate should be not less than about 1.5 cubic feet per hour (hereinafter denoted as "c.f.h.") and not more than about 6 c.f.h., the preferred value being 3 to 5 c.f.h. The optimum flow rate of the monatomic gas varies with the internal diameter of the hollow electrode, and for larger sizes the rates will be higher than those given above for the 7/64 inch size, and for smaller sizes the rates will be lower. The rate of flow of carbon dioxide through the annular passageway 22 is preferably maintained at a rate of between about 25 and about 80 c.f.h., values between 40 and 60 c.f.h. being preferred. It has been found that with high current densities, high flow rates of carbon dioxide are desirable. The control of the flow of gases can be accomplished by suitable pressure regulators and flow gauges which are conventional in the art and which are not described herein.

The composition of the hollow electrode 10 has an important bearing on the success of the arc welding method. Hollow electrodes formed from a tube of mild steel are satisfactory under some conditions. However, for best results, the carbon, manganese, silicon, phosphorus and sulfur content must be controlled within specified limits. The preferred form of steel for forming the hollow electrode 10 has the following range of analytical values:

| | |
|---|---|
| Carbon | 0.20% maximum |
| Manganese | 0.60 to 2.0% |
| Silicon | 0.20 to 0.90% |
| Phosphorus | 0.035% maximum |
| Sulfur | 0.025% maximum |

In view of the detailed description given above, the operation of the present invention will readily be understood by those skilled in the art. The invention contemplates the use of a hollow steel electrode through which passes a slow stream of an inert gas such as argon or helium to control spatter. A surrounding envelope of carbon dioxide shields the arc from the atmosphere, so that a very satisfactory weld is obtained.

The invention is further disclosed by the following examples which illustrate successful welding operations conducted in accordance with this invention.

*Example 1*

A tubular welding electrode was prepared from a strip of steel containing 0.20% carbon, 1.00% manganese, 0.54% silicon, 0.022% sulfur, 0.035% phosphorus. The electrode was 3/16 inch in diameter with a wall thickness of 0.040 inch. The electrode was fit into a standard Auto-Arc welding head as part of the arc voltage-controlled electrode drive unit. A control unit was provided to control the welding head and worm driven traversing mechanism, and at the same time to control gas flow. A mercury switch was mounted on the off-on weld control handle to start and stop the flow of gas along with the welding control. The mercury switch controlled the solenoid valves in the gas lines. A 900 ampere motor generator was used as power source.

A flow meter with a range from 0 to 10 c.f.h. was used to indicate the flow of gas through the hollow electrode. The optimum rate of flow of argon within the electrode was 3 c.f.h. with a minimum requirement of 2 c.f.h. Carbon dioxide at the rate of 60 c.f.h. was used for shielding. A welding current of 550 amperes at a voltage of 31 volts was used. The travel rate was 27 inches per minute.

The beads so deposited under these conditions were free of porosity and of good profile. The surface was smooth and regular, and there was no appearance of overheating. Metal transfer was very regular and controlled with few large spatter globules and little spray spatter. There was little smoke and fume.

*Example 2*

A 3/16 inch hollow electrode having a wall thickness of 0.040 inch containing 0.10% carbon, 0.90% manganese, 0.45% silicon, 0.025% sulfur and 0.025% phosphorus was employed in the same arc welding apparatus as described in Example 1. The rate of flow of argon was maintained at about 3 c.f.h. and the rate of flow of carbon dioxide at 60 c.f.h. The welds so obtained were sound and ductile with good bead profile and low porosity. The ultimate tensile strength of the weld was 65,000 p.s.i. and the yield strength was 55,000 p.s.i. The ductility and notch toughness were excellent and the density of the weld metal was consistently sound.

*Example 3*

In this example, 3/16 inch seamless steel tubing with 20 gauge wall thickness was employed. The electrode had a silicon content of 0.40% and a manganese content of 0.90%. The flow rate of argon through the hollow electrode was 4 c.f.h. and the flow of carbon dioxide was 60 c.f.h. The metal transfer was a smooth spray type with little spatter. The beads deposited were free of porosity and the welds had good mechanical properties.

*Example 4*

A 3/16 inch hollow electrode having a wall thickness of 0.04 inch and containing 0.12% carbon, 0.92% manganese, 0.44% silicon, 0.018% phosphorus, 0.023% sulfur and 0.05% aluminum was used in the apparatus described in Example 1, with argon flow rate at about 3 c.f.h. and carbon dioxide at 60 c.f.h. The ultimate tensile strength of the weld so produced was 73,950 p.s.i. and the yield strength was 60,000 p.s.i. with 27% elongation in 2 inches.

*Example 5*

A similar electrode containing 0.15% carbon, 0.93% manganese, 0.38% silicon, 0.018% phosphorus and 0.023% sulfur with argon-carbon dioxide shielding deposited weld metal having an ultimate tensile strength of 67,400 p.s.i., a yield strength of 52,250 p.s.i. and elongation of 36% in 2 inches.

In summary, the embodiment of the improved method and apparatus of transferring metals provides an improved welding process which can be utilized to produce high strength joints at relatively high welding speeds up to 60 inches per minute utilizing either alternating current or direct current with little or no preparation of the metals to be joined. The methods are further characterized in providing low porosity welds without the use of fluxes, or slag shielding the method also provides relatively high speed welding with unrestricted visibility of the arc.

While there has been described an improved process of transferring metals and a plurality of electrodes to be used with this process, it should be understood that various changes and modifications of the process and apparatus and electrodes for use therewith will occur to those skilled in the art, and it is intended in the appended claims to cover all those changes and modifications which fall within the true spirit and scope of the present invention.

What is claimed as new and is desired to be secured by Letters Patent of the United States is:

1. The method of arc welding by a continuous welding process which comprises spacing an effectively endless hollow consumable electrode apart from a mass of metal to be welded, establishing an electric arc between said electrode and said metal, providing an envelope of shielding gas around said arc and passing a slow stream of a monatomic gas through said hollow electrode to physically assist in the transfer of small particles of molten metal from the electrode to said mass of said metal.

2. The method of arc welding by a continuous welding process which comprises spacing an effectively endless hollow consumable electrode apart from a mass of metal to be welded, establishing an electric arc between said electrode and said metal, providing an envelope of shielding gas around said arc and the pool of molten metal resulting therefrom, and passing a slow stream of an inert gas through said hollow electrode to physically assist in the transfer of small particles of molten metal from the electrode to said pool.

3. The method of arc welding by a continuous welding process which comprises spacing an effectively endless hollow steel electrode apart from a mass of ferrous metal to be welded, establishing an electric arc between said electrode and said metal, providing an envelope of shielding gas around said arc and the pool of molten metal resulting therefrom, and passing a slow stream of a monatomic gas through said hollow electrode to physically assist in the transfer of small particles of molten metal from the electrode to said pool.

4. The method of arc welding by a continuous welding process which comprises spacing an effectively endless hollow steel electrode apart from a mass of ferrous metal to be welded, establishing an electric arc between said electrode and said metal, providing an envelope of shielding carbon dioxide gas around said arc and the pool of molten metal resulting therefrom, and passing a slow stream of a monatomic gas through said hollow electrode to physically assist in the transfer of small particles of molten metal from the electrode to said pool.

5. The method of arc welding by a continuous welding process which comprises spacing an effectively endless hollow steel electrode apart from a mass of ferrous metal to be welded, establishing an electric arc between said electrode and said metal, providing an envelope of shielding carbon dioxide gas around said arc and the pool of molten metal resulting therefrom, and passing a slow stream of a monatomic gas selected from the group consisting of argon and helium through said hollow electrode to physically assist in the transfer of small particles of molten metal from the electrode to said pool.

6. The method of arc welding by a continuous welding process which comprises spacing an effectively endless hollow steel electrode apart from a mass of ferrous metal to be welded, establishing an electric arc between said electrode and said metal, providing an envelope of shielding carbon dioxide gas around said arc and the pool of molten metal resulting therefrom, and passing a slow stream of argon through said hollow electrode to physically assist in the transfer of small particles of molten metal from the electrode to said pool.

7. The method of arc welding by a continuous welding process which comprises spacing an effectively endless hollow steel electrode apart from a mass of ferrous metal to be welded, establishing an electric arc between said electrode and said metal, providing an envelope of shielding carbon dioxide gas around said arc and the pool of molten metal resulting therefrom, and passing a slow stream of argon through said hollow electrode to physically assist in the transfer of small particles of molten metal from the electrode to said pool, said hollow steel electrode having low carbon, phosphorus and sulfur content and medium manganese and silicon content.

8. The method of arc welding by a continuous welding process which comprises spacing an effectively endless hollow steel electrode apart from a mass of ferrous metal to be welded, establishing an electric arc between said electrode and said metal, providing an envelope of shielding carbon dioxide gas around said arc and the pool of molten metal resulting therefrom, and passing a slow stream of argon through said hollow electrode to physically assist in the transfer of small particles of molten metal from the electrode to said pool, said steel electrode containing about 0.60 to 2.0% manganese, 0.20 to 0.90% silicon, not more than 0.035% phosphorus, not more than 0.025% sulfur, and not more than 0.20% carbon.

9. The method of arc welding by a continuous welding process which comprises spacing an effectively endless hollow steel electrode apart from a mass of ferrous metal to be welded, establishing an electric arc between said electrode and said metal, providing an envelope of shielding carbon dioxide gas around said arc and the pool of molten metal resulting therefrom, and passing a stream of argon at a rate of about 1.5 to 6 cubic feet per hour through said hollow steel electrode to physically assist in the transfer of small particles of molten metal from the electrode to said pool, said hollow steel electrode having low carbon, phosphorus and sulfur content, and medium manganese and silicon content.

References Cited in the file of this patent

UNITED STATES PATENTS

| | | |
|---|---|---|
| 1,106,347 | Herrick | Aug. 4, 1914 |
| 1,161,366 | Wohlrab | Nov. 23, 1915 |
| 1,193,989 | Cadle | Aug. 8, 1916 |
| 1,468,937 | Armstrong | Sept. 25, 1923 |
| 2,473,601 | Lobosco | July 21, 1949 |
| 2,504,867 | Muller | Apr. 18, 1950 |
| 2,522,482 | Olzak | Sept. 12, 1950 |
| 2,621,278 | Muller | Dec. 9, 1952 |
| 2,686,860 | Buck et al. | Aug. 17, 1954 |
| 2,859,329 | Lesnewich | Nov. 4, 1958 |
| 2,870,320 | Mathews | Jan. 20, 1959 |

FOREIGN PATENTS

| | | |
|---|---|---|
| 279,886 | Great Britain | Dec. 8, 1927 |

OTHER REFERENCES

The Welding Encyclopedia, 12th Edition, 1947, The Welding Publishing Co., New York, N.Y., pp. 474 and 670.